United States Patent [19]

Clark

[11] 3,954,169
[45] May 4, 1976

[54] VIBRATING FEEDER DEVICE

[76] Inventor: LaVerne W. Clark, 22 Merrill Court, Bristol, Conn. 06010

[22] Filed: Jan. 23, 1975

[21] Appl. No.: 543,420

[52] U.S. Cl. .................. 198/220 CA; 198/220 DC; 267/160
[51] Int. Cl.² ........................................ B65G 27/00
[58] Field of Search ............... 198/220 BA, 220 CA, 198/220 DA, 220 DC; 310/15, 17; 267/160

[56] References Cited
UNITED STATES PATENTS

| | | | |
|---|---|---|---|
| 2,100,878 | 11/1937 | Shallock ..................... | 198/220 CA |
| 2,243,936 | 6/1941 | Wurzbach et al. ........... | 198/220 CA |
| 3,627,112 | 12/1971 | Smith ........................... | 198/220 DC |
| 3,786,912 | 1/1974 | Taylor .......................... | 198/220 DC |

FOREIGN PATENTS OR APPLICATIONS 874,185    8/1961    United Kingdom .......... 198/220 DC

*Primary Examiner*—John J. Love
*Assistant Examiner*—Joseph E. Valenza

[57] ABSTRACT

An electromagnetic feeder device operable for creating controlled vibration is provided which is particularly suited to be employed in association with automatic machinery for purposes of moving disoriented parts into orientation, for inspecting and/or counting and/or applying parts, etc. Moreover, the electromagnetic feeder device is characterized by the fact that means are embodied therein which permit both the frequency of vibration to be tuned and the armature gap setting to be adjusted while the device is operating. The electromagnetic feeder device has embodied therein an electromagnet coil. The latter coil is supported on a coil mounting plate suitably provided for this purpose. In turn, the coil mounting plate is supported on a base angle plate which itself is supported on a base angle whereby the vibrating firing angle of the electromagnetic feeder device may be adjusted, i.e., the device may be made to vibrate left or right. Each end of the base angle plate is connected by means of a corresponding side plate to a respective end of a top plate. The electromagnetic feeder device further includes an armature suitably positioned therein so as to be cooperatively associated with the aforementioned electromagnet coil whereby the armature is capable of moving relative to the coil. The armature is operatively connected by means of an armature arm to a top angle plate located in suitably spaced relation to the top plate. In addition, there is embodied in the subject electromagnetic feeder device a multiplicity of springs, the latter being arranged so as to form two sets thereof. One set of springs has one end thereof connected to one end of the top angle plate and the other end thereof operatively connected to one end of the base angle plate. In a similar manner, the other set of springs has one end thereof connected to the other end of the top angle plate and the other end thereof operatively connected to the other end of the base angle plate.

13 Claims, 8 Drawing Figures

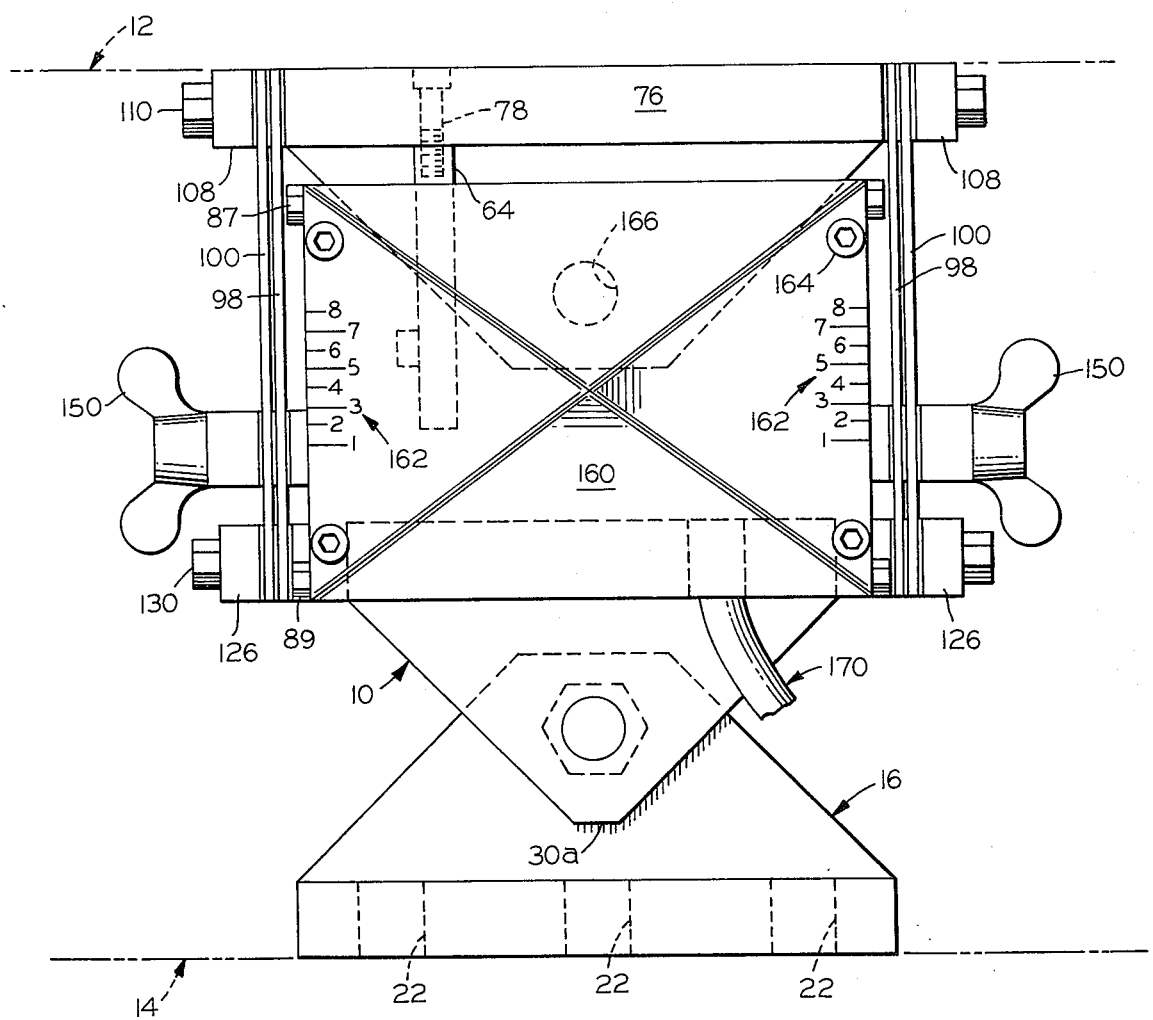
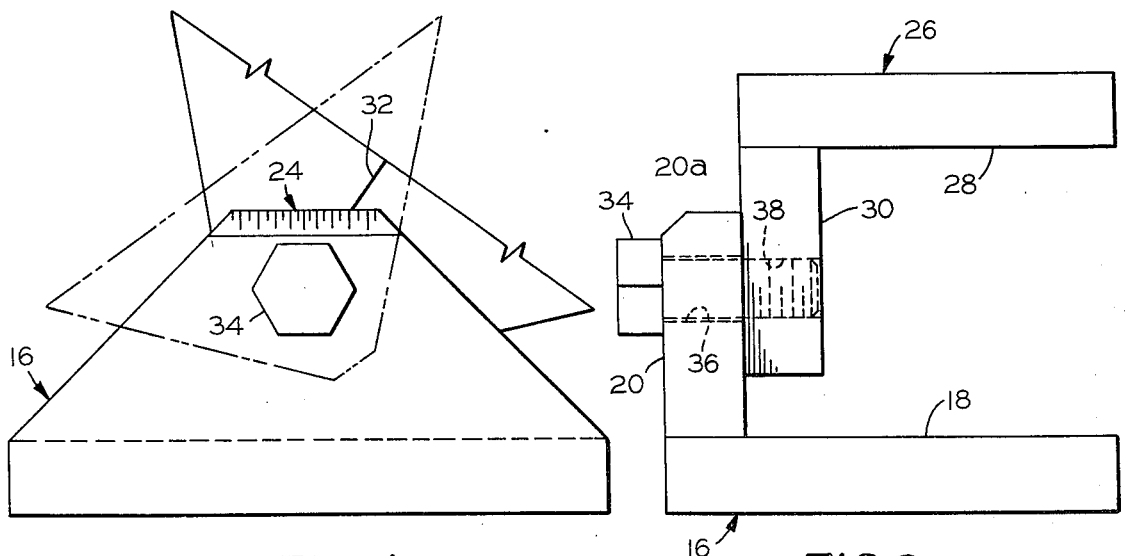

VIBRATING FEEDER DEVICE

BACKGROUND OF THE INVENTION

It is readily apparent from a reference to the prior art that it has long been known to provide feeder devices that are operable for purposes of causing objects to be conveyed from one location to another. The conveyed objects can take many forms but are most often characterized by the fact that they are relatively small in size. For example, the objects may comprise small parts such as rivets, nuts, screws, etc. which are being conveyed from one location whereat a suitable supply thereof is provided to another location whereat some form of automatic machinery is located which in turn is operable to cause the conveyed parts to be assembled with other parts to form some larger assembly. In other instances, the objects may take the form of pharmaceutical products such as pills which are caused to be conveyed by the feeder device from a suitable source of supply thereof to some form of pill dispensing apparatus, the latter being operable to cause a predetermined count of the pills to be dispensed into a suitable receptacle such as a bottle, etc. Another application in which such feeder devices are utilized is that of supplying bottle caps to automatic bottling machinery. In the latter type of application, the feeder devices provide a means whereby bottle caps are provided to the bottling machinery which in turn functions to cause the caps to be applied to the bottles after the latter have been filled with a suitable form of contents.

There have also been provided heretofore in accord with the teachings of the prior art feeder devices which are operable to perform in lieu of or in addition to the conveying function, other types of functions. More specifically, there have been provided feeder devices which embody means operable to render the feeder device capable of performing the additional function of causing objects, which are disoriented, to become oriented as they are being conveyed. Other feeder devices on the other hand, have embodied means operable so as to enable a feeder device which is so equipped to perform a counting function as well as a conveying function. Namely, through the operation of this form of feeder device the objects as they are being conveyed are also capable of being counted. To further exemplify the additional functions which feeder devices have been known to perform, reference will be made by way of illustration to the fact that it has been known to provide feeder devices embodying means whereby the feeder device is operable to enable an inspection function to be performed on the objects which are conveyed through operation of the feeder device.

Although the aforedescribed forms of feeder devices are essentially all characterized by the fact that they are operative to cause objects to be conveyed from one location to another, the means by which the conveying function is accomplished differs. For example, some prior art forms of feeder devices rely on gravity to provide the force through which the objects are caused to move from one point to another. In other instances, a mechanical means such as a rotating belt is associated with the feeder device whereby objects placed on the belt are conveyed from one locationn to another as the belt rotates. Another form of motive power operable to impart movement to objects with which feeder devices have often been equipped is that of vibration. More specifically, this form of feeder device is designed to be operable to generate a straight line vibratory motion whereby in turn objects which are subjected thereto will be caused to move in a straight line direction from one point to another. This vibratory motion is commonly produced through the action of an electromagnet. It has been found necessary, however, with a vibratory feeder device that the frequency of vibration generated thereby must be varied depending upon the nature of the objects, i.e., the load to which it is desired to impart movement. Namely, the vibratory feeder device must embody means capable of enabling the feeder device to provide resonant action for a variety of different loads.

With further reference to the vibratory form of feeder device, although a number of different embodiments thereof have been provided heretofore in the prior art, in general they have all been disadvantageously characterized by the fact that they are difficult to adjust. More specifically, as was noted in the preceding paragraph it is desirable that the feeder devices be capable of being adjusted so that they are capable of being tuned depending on the load with which they are being employed. Obviously, it would not be desirable either from an economic standpoint or from the standpoint of ease of employment to be required to provide a different vibratory feeder device for each different load. Recognizing the latter, prior art efforts have resulted in providing feeder devices which do embody the aforedescribed adjustment capability. The disadvantage therewith, however, has been that in order to effect the adjustment such vibratory feeder devices must be in an inoperative condition. Namely, the operation of the vibratory feeder device must be stopped to effect the adjustment. The need therefor, however, renders the task of performing the adjustment difficult in that it is necessary to employ a trial and error procedure to properly tune the subject vibratory feeder device. More specifically, it has been necessary to follow the following procedure in order to effect a tuning of such a vibratory feeder device. First, recognizing that the vibratory feeder device is not tuned for the particular load with which it is desired to be employed, the feeder device must be shut off. With the feeder device in an inoperative state, the frequency of vibration of the feeder device is adjusted by means of the adjustment means with which the latter is provided. Then, the vibratory feeder device is once again placed in an operative state in order to determine whether the adjustment which has been made is sufficient to cause the vibratory feeder device to be tuned for the particular load with which it is to be employed. If it is found that the vibratory feeder device is still not properly tuned, then the feeder device must once again be shut off and a further adjustment made thereto. The aforedescribed procedure is continuously repeated until the vibratory feeder device becomes properly tuned. Obviously, such an adjustment procedure represents a time-consuming task.

There has therefore been evidenced a need to provide a new and improved vibratory feeder device which would obviate the disadvantages possessed by prior art forms thereof. More specifically, although a number of vibratory feeder devices have been provided heretofore, none of them have proven to be entirely satisfactory when placed in operation. By and large, this has been because such prior art forms of vibratory feeder device are characterized by the need to practice the procedure described in the preceding paragraph to effect an adjustment thereof. In addition, others of such prior art vibratory feeder devices have been disadvantageously characterized insofar as concerns the extent to which they can be considered to be versatile.

Accordingly, it is an object of the present invention to provide a novel and improved feeder device of the type which is particularly suited to be employed in association with automatic machinery for purposes of conveying objects thereto.

It is another object of the present invention to provide such a feeder device which is of the vibratory type.

A further object of the present invention is to provide such a feeder device which in addition to the conveying function is also capable of being employed to effect orientation of disoriented objects, to enable the conveyed objects to be counted, to enable the conveyed objects to be inspected, etc.

A still further object of the present invention is to provide such a vibratory feeder device which is characterized in the fact that it possesses the capability of enabling the frequency of vibration thereof to be tuned while the device is operating.

Yet another object of the present invention is to provide such a vibratory feeder device which is characterized in the fact that it possesses the capability of enabling the armature gap setting to be adjusted while the device is operating.

Yet still another object of the present invention is to provide such a vibratory feeder device which is characterized by its flexibility in that it permits tooling to be bolted thereto either on the left side thereof, the right side thereof, or the top thereof, also by the fact that it embodies a durable construction, and finally by the fact that it is capable of high speed operation.

SUMMARY OF THE INVENTION

It has now been found that the foregoing and related objects can be readily attained in an electromagnetic feeder device operable for creating controlled vibration which is particularly suited to be employed in association with automatic machinery for purposes of moving disoriented parts into orientation, for inspecting and/or counting and/or applying parts, etc. The electromagnetic feeder device of the present invention is characterized by the fact that means are embodied therein which permit both the frequency of vibration to be tuned and the armature gap setting to be adjusted while the device is operating. The electromagnetic feeder device has embodied therein an electromagnet coil. The latter coil is supported on a coil mounting plate suitably provided for this purpose. In turn, the coil mounting plate is supported on a base angle plate which itself is supported on a base angle whereby the vibrating firing angle of the electromagnetic feeder device may be adjusted, i.e., the device may be made to vibrate left or right. Each end of the base angle plate is connected by means of a corresponding side plate to a respective end of a top plate. The electromagnetic feeder device further includes an armature suitably positioned therein so as to be cooperatively associated with the aforementioned electromagnet coil whereby the armature is capable of moving relative to the coil. The armature is operatively connected by means of an armature arm to a top angle plate located in suitably spaced relation to the top plate. In addition, there is embodied in the subject electromagnetic feeder device a multiplicity of spring members, the latter being arranged so as to form two sets thereof. One set of springs has one end thereof connected to one end of the top angle plate and the other end thereof operatively connected to one end of the base angle plate. In a similar manner, the other set of springs has one end thereof connected to the other end of the top angle plate and the other end thereof operatively connected to the other end of the base angle plate.

In accord with the preferred embodiment thereof, the vibratory feeder device is suitably constructed so as to be capable of providing high speed operation in the order of 3,600 vibrations per minute. In addition, the aforereferenced spring members comprise adjustable spring tension bars that are operable to permit easy on-the-job tuning of the subject vibratory feeder device. Moreover, by virtue of the fact that the vibratory feeder device of the present invention possesses the feature of adjustable armature gap setting, the latter may be adjusted while the feeder device is operating thereby to lower load current and lengthen coil life. Other features of the subject vibratory feeder device constructed in accord with the preferred embodiment thereof are the employment therein of a special heavy-duty electromagnet coil, and the use of heavy-duty springs having a protective plating preferably of nickel thereon whereby to be operable to provide long spring life. Another characteristic of the preferred embodiment of the subject vibratory feeder device is the fact that the vibrating firing angle thereof is adjustable from 0°–40° and that the device may be made to vibrate either left or right depending on the direction the device is tipped. Furthermore, although the vibratory feeder device of the present invention is of heavy-duty construction, it nevertheless is compact in size. Also, the subject vibratory feeder device is easy to mount on machinery or to build tooling therearound. In connection with the latter, the tooling may be bolted to the left side, the right side or on the top of the vibratory feeder device. Finally, the vibratory feeder device of the present invention has a low noise level when properly tuned, and is capable of carrying a tooling load of 10 pounds.

BRIEF DESCRIPTION OF THE DRAWINGS

FIG. 1 is a side elevational view of a vibratory feeder device constructed in accordance with the present invention;

FIG. 3 is an end elevational view of a portion of a vibratory feeder device constructed in accordance with the present invention, illustrating the bottom angle and the base mounting angle thereof in the assembled condition;

FIG. 4 is a side elevational view of the bottom angle and the base mounting angle in the assembled condition of a vibratory feeder device constructed in accordance with the present invention, illustrating in solid lines the bottom angle indexed to a first position relative to the base mounting angle and in broken lines the bottom angle indexed to a second position relative to the base mounting angle thereby exemplifying the manner in which the bottom angle is capable of being pivoted relative to the base mounting angle;

DETAILED DESCRIPTION OF THE ILLUSTRATED EMBODIMENT

Figure 2:
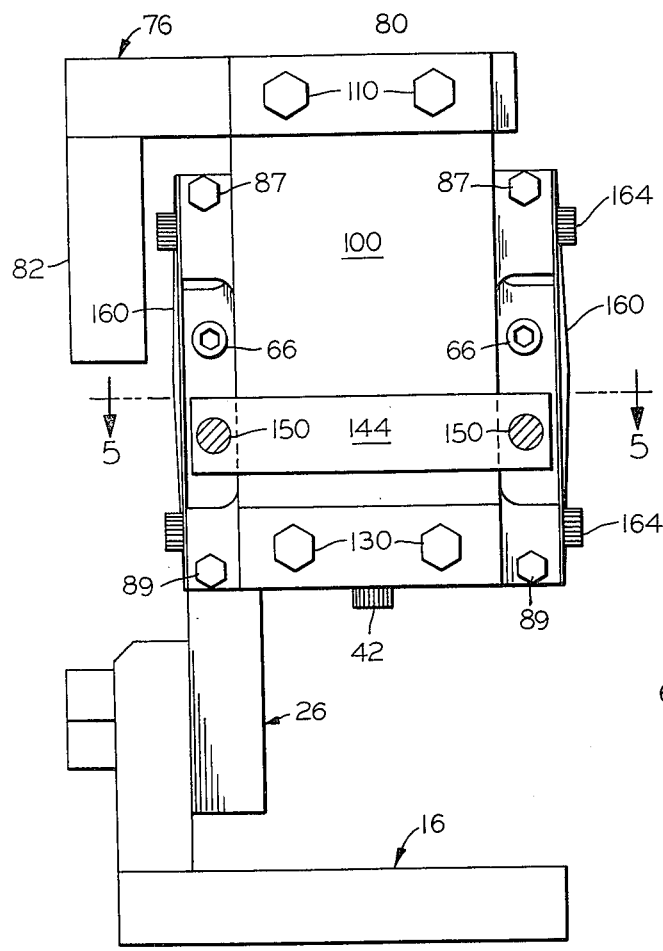
FIG. 2 is an end elevational view of a vibratory feeder device constructed in accordance with the present invention.

Referring now to the drawings and more particularly FIGS. 1 and 2 thereof, there is illustrated therein a vibratory feeder device, generally designated by reference numeral 10, constructed in accordance with the present invention. The vibratory feeder device 10 which is operable for creating controlled vibration is particularly suited to be employed in association with automatic machinery for purposes of moving disoriented parts into orientation, for inspecting and/or counting and/or applying parts, etc. Moreover, the vibratory feeder device 10 constructed in accordance with the present invention is characterized by the fact that means are embodied therein which permit both the frequency of vibration to be tuned and the armature gap setting to be adjusted while the device 10 is in operation.

In a manner to which further reference will be had hereinafter, the vibratory feeder device 10 of the present invention is preferably employed in pairs with tooling, schematically depicted in FIG. 1 of the drawings by means of the line designated therein by reference numeral 12, being suitably mounted thereon. The latter tooling 12 may take the form for instance of a chute along which, by virtue of the vibrations which are created by the vibratory feeder device 10, objects are caused to move, i.e., be fed from a suitable source of supply thereof (not shown) to some form of automatic machinery (not shown) whereat the objects are utilized. Furthermore, the vibratory feeder device 10 in accord with the preferred method of employment thereof is preferably mounted in a manner yet to be described on a suitable mounting surface, the latter being schematically depicted in FIG. 1 of the drawings by the line appearing therein which is designated by reference numeral 14.

Considering first the manner in which the vibratory feeder device 10 is mounted on the mounting surface 14, the former includes a base mounting angle 16 which is employed in this connection. The base mounting angle 16 as best understood with reference to FIGS. 2 and 3 of the drawings is substantially L-shaped in configuration. The latter configuration is provided by a horizontally extending leg 18 which in accord with the preferred embodiment of the invention is formed integrally with a vertically extending leg 20 whereby substantially a right angle is formed by the intersection of the leg 18 with the leg 20. As best understood with reference to FIG. 1 of the drawings, when the vibratory feeder device 10 is placed in mounted relation on the mounting surface 14, the leg 18 of the base mounting angle 16 is positioned in juxtaposed relation to the mounting surface 14. In addition, it is preferable when mounting the vibratory feeder device 10 on the mounting surface 14 that the former be fastened to the latter.

To this end, as depicted in FIG. 1, the leg 18 is preferably provided with a plurality of suitably dimensioned openings 22 located therein in suitably spaced relation to each other whereby fasteners (not shown) may be passed therethrough and into threaded engagement in the openings (not shown) which are provided for this purpose in the mounting surface 14. The other leg, i.e., the vertically extending leg 20 of the base mounting angle 16 as best understood with reference to FIGS. 1 and 4 embodies a substantially triangular configuration but with the free end thereof being cut to form a substantially horizontal surface 20a. Indicia 24 are provided, for a purpose which will be described subsequently on the outer surface of the leg 20 so as to be located in juxtaposed relation to the surface 20a thereof. In this connection, it will suffice at this point to merely note that the indicia 24 comprises markings of angular measurement.

The base mounting angle 16 in addition to functioning as the means by which the vibratory feeder device 10 is mounted on the mounting surface 14 also functions as the base for the vibratory feeder device 10. Moreover, as best understood with reference to FIG. 1 of the drawings the base mounting angle 16 has a bottom angle 26 operatively connected thereto. The latter bottom angle 26 as best shown in FIG. 3 is substantially L-shaped in configuration. More specifically, the bottom angle 26 embodies a construction which is substantially similar to that of the base mounting angle 16 described previously hereinabove. Namely, the bottom angle 26 consists of a horizontally extending leg 28 which has formed integrally therewith a vertically extending leg 30 whereby to provide substantially a right angle therebetween. As in the case of the leg 20 of the base mounting angle 16, the vertically extending leg 30 of the bottom angle 26 is also provided with a center line marking 32, the latter being shown in FIG. 4 of the drawings, which is suitably located on the leg 30 so as to be cooperable in a manner yet to be described with the indicia 24 which is provided on the leg 20 of the base mounting angle 16. Completing the description of the bottom angle 26 and the base mounting angle 16, the latter two members are operatively connected together in accord with the illustrated embodiment of the invention by means of a threaded fastener, i.e., the bolt 34, whereby a pivoted connection is established therebetween. To this end, the base mounting angle 16 has an opening 36 provided in the leg 20 thereof substantially at the center thereof through which the shank of the bolt 34 passes, and the leg 30 of the bottom angle 26 has a threaded opening 38 formed therein substantially at the center thereof in which the threaded end of the bolt 34 is received in threaded engagement therewith, whereby the bottom angle 26 is capable of being pivoted about the bolt 34 and relative to the base mounting angle 16 in a manner and for a purpose which will be set forth subsequently.

Figure 7:
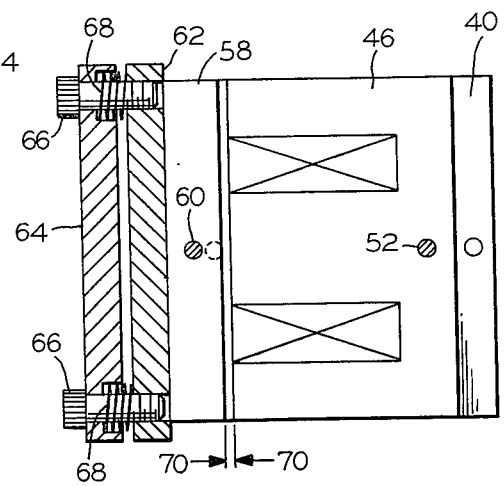
FIG. 7 is a cross sectional view of a vibratory feeder device constructed in accordance with the present invention taken substantially along the line 7—7 in FIG. 6.
Figure 6:
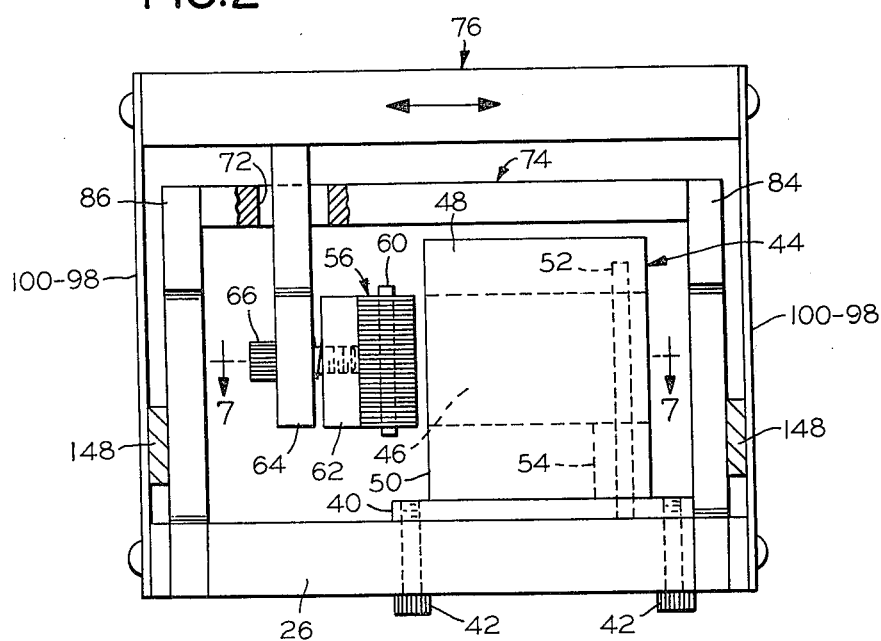
FIG. 6 is a side elevational view of a portion of a vibratory feeder device constructed in accordance with the present invention, illustrated with the cover removed to expose the interior construction thereof.

Continuing with the description of the nature of the construction of the vibratory feeder device 10, reference will be had for this purpose particularly to FIGS. 1, 2 and 6 of the drawings. As best seen in FIG. 6, a coil mounting plate 40 rectangular in configuration is suitably fastened to the uppersurface of the bottom angle 26 through the use of any conventional form of fastening means. However, in accord with the illustrated embodiment of the present invention, the aforesaid fastening of the coil mounting plate 40 on the bottom angle 26 is effected through the use of a pair of threaded fasteners 42 which are passed through suitably dimensioned holes provided for this purpose in the bottom angle 26 and are received in threaded engagement in suitably located threaded openings provided in the coil mounting plate 40. The coil mounting plate 40 functions as a mounting surface for the coil assembly 44. The latter assembly 44 in accord with the conventional practice preferably consists of a multiplicity of magnetic laminations 46 which are held captured between an upper member 48 and a lower member 50 by means of a suitable securing means 52. The latter means 52 may take the form of a suitably dimensioned roll pin extending through the coil assembly 44. In accord with the illustrated embodiment of the invention there is also preferably employed in association with the coil assembly 44 an elongated coil spacer bar 54, the latter being supported on the coil mounting plate 40 in juxtaposed relation to the coil assembly 44. With further reference to FIG. 6 of the drawings, an armature assembly 56 is suitably supported in the vibratory feeder device 10 in a manner which will now be described so as to be cooperable with the previously described coil assembly 44. The armture assembly 56 includes a multiplicity of magnetic laminations 58 suitably held together by means of a roll pin 60 that is passed therethrough. The armature assembly 56 further includes an armature bar 62 with which the aforedescribed magnetic laminations 58 are operatively joined, through the use of any suitable form of conventional securing means, so as to form a unitary assembly. The armature assembly 56 and more specifically the armature bar 62 thereof, as best understood with reference to FIGS. 6 and 7 of the drawings is operatively connected to one end of an armature arm 64. More specifically, the armature bar 62 is connected to the armature arm 64 so as to be movable relative thereto. To this end, a pair of threaded fasteners 66 are provided. Each of the fasteners 66 is passed through a suitably dimensioned opening provided therefor in the armature arm 64. In addition, each of the fasteners 66 is threadedly received in a threaded opening with which the armature bar 62 is provided. Moreover, as shown in FIG. 7 of the drawings, each of the threaded fasteners 66 has a spring 68 associated therewith. Each of the springs 68 in turn surrounds a portion of the shank of the corresponding fastener 66 and has one end thereof bearing against the surface of the armature bar 62 and the other end in engagement with a seat provided therefor in the armature arm 64. The latter seat is formed by counterboring one end of each of the openings with which the armature arm 64 is provided for purposes of receiving the fasteners 66. By virtue of the aforedescribed construction, the position of the armature bar 62 and more specifically the position of the armature assembly 56 is capable of being adjusted relative to the armature arm 64 and thereby in turn enabling an adjustment of the armature gap setting, i.e., the spacing designated by the twin arrows 70 in FIG. 7 of the drawings between the armature assembly 56 and the coil assembly 44, to be effected.

Continuing with a description of the manner in which the armature assembly 56 is supported in the vibratory feeder device 10, as best understood with reference to FIG. 6 of the drawings, the end of the armature arm 64 opposite that to which the armature assembly 56 is operatively connected is passed through an opening 72 formed in a top plate 74 and is secured to a top angle plate 76. The aforesaid end of the armature arm 64 may be fastened to the top angle plate 76 through the use of any suitable form of conventional fastening means, such as for instance through the use of threaded fasteners 78, one of which has been depicted in FIG. 1 of the drawings. It will be noted with reference to FIG. 6 that the opening 72, for a purpose which will become readily apparent hereinafter, is suitably dimensioned so as to provide a substantial amoount of clearance on either side of the portion of the armature arm 64 which passes therethrough whereby to enable the latter to move within the opening 72, i.e., relative to the side walls which define the latter. Turning now to a consideration of the nature of the construction of the top angle plate 76 and the top plate 74, the former as best understood with reference to FIG. 2 of the drawings embodies a construction which is substantially similar to that of the bottom angle 26 which has been described previously hereinabove. Namely, the top angle plate 76 includes a horizontally extending leg 80 and a vertically extending leg 82 which are preferably formed integrally with each other. Moreover, the horizontally extending leg 80 and the vertically extending leg 82 preferably intersect with each other so as to form substantially a right angle therebetween. The top plate 74 on the other hand is substantially rectangular in configuration, and with the aforementioned opening 72 formed therein comprising an elongated slot extending substantially the width of the top plate 74.

With further reference to FIG. 6 of the drawings, the top plate 74 is operatively connected to the bottom angle 26 by means of a pair of side plates 84 and 86, respectively. More specifically, each of the side plates 84 and 86 has one end thereof fastened to one end of the top plate 74 and the other end thereof fastened to one end of the bottom angle 26. Although any suitable form of conventional fastening means may be utilized for purposes of fastening the side plates 84 and 86 to the top plate 74 and the bottom angle 26, in accord with the illustrated embodiment of the invention, this function is accomplished through the use of a plurality of threaded fasteners 87 and 89. Namely, as best understood with reference to FIG. 8 of the drawings wherein the side plate 86 is visible, each of the side plates 84 and 86 is provided with a pair of openings 88 adjacent the top edge thereof, an outer pair of openings 90 adjacent the lower edge thereof, and an inner pair of openings 92 also adjacent the lower edge thereof. The openings 88 are aligned with a pair of threaded openings 94 whereby the aforereferenced threaded fasteners 87 are passed through the openings 88 and received in threaded engagement in the threaded openings 94 for purposes of fastening the upper end of the side plate 86 to the top plate 74. In a like manner (not shown) the upper end of the side plate 84 is fastened to the other end of the top plate 74. Also, in a similar manner, the lower end of the side plate 86 is fastened to the bottom angle 26 by passing the aforereferenced threaded fasteners 89 through the outer pair of openings 90 with which the side plate 86 is provided and into threaded engagement with the pair of threaded openings 96, only one of which is visible in the drawings, with which the bottom angle 26 is provided at each end thereof. The lower end of the side plate 84 is fastened to the bottom angle 26 in the same manner as that described hereinabove whereby the lower end of the side plate 86 is fastened to the bottom angle 26.

Figure 8:
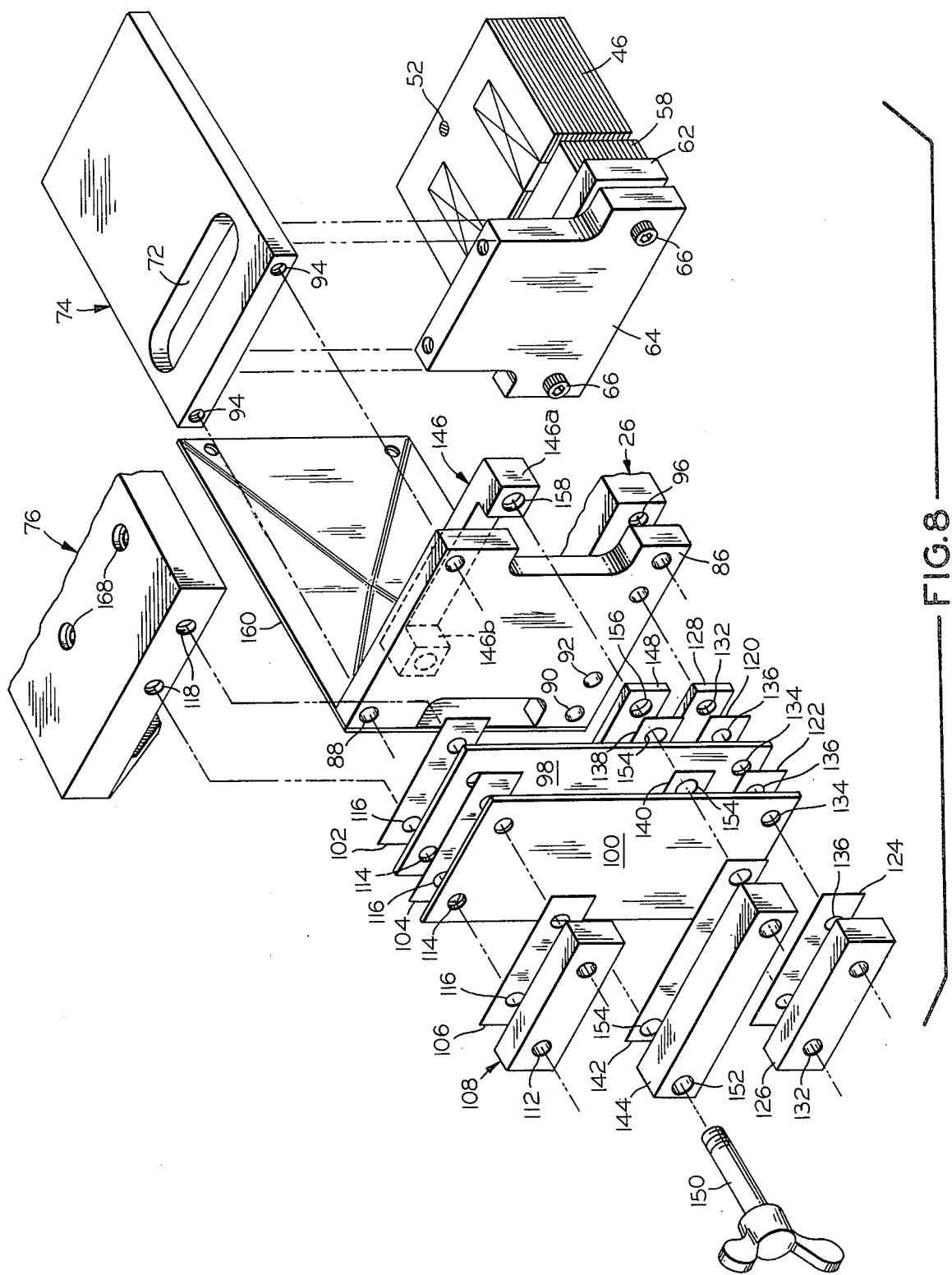
FIG. 8 is an exploded perspective view with parts broken away of a vibratory feeder device constructed in accordance with the present invention.

Insofar as concerns the nature of the construction of the remaining portion of the vibratory feeder device 10, reference will again be had to FIG. 8 of the drawings. In this connection, although only the components which are embodied in the vibratory feeder device 10 on one side thereof are clearly seen in FIG. 8, it is to be understood that the other side of the vibratory feeder device 10 which is not illustrated in FIG. 8 is similarly constructed to that which is shown therein. Consequently, it is deemed sufficient for purposes of obtaining an understanding of the present invention, and more particularly an understanding of the nature of the construction of the vibratory feeder device 10 to merely set forth hereinafter a detailed description of the nature of the construction of the side of the vibratory feeder device 10 which is seen in FIG. 8. With reference therefore to FIG. 8, the vibratory feeder device 10 further embodies a pair of platelike spring members 98 and 100. The latter spring members 98 and 100 function as primary springs for the vibratory feeder device 10. Cooperatively associated with the spring members 98 and 100 are a multiplicity of spring shims. More specifically, three spring shims 102, 104 and 106 are cooperatively associated with the upper ends, as viewed with reference to FIG. 8 of the drawings, of the spring members 98 and 100 whereby the spring shim 102 is located on the outside of the spring member 98, the spring shim 104 is located between the spring members 98 and 100, and the spring shim 106 is located on the outside of the spring member 100. In accord with the illustrated embodiment of the invention, the spring members 98 and 100 are preferably formed of spring steel, while the spring shims 102, 104 and 106 are each formed of relatively thin nylon. There is also associated with the spring members 98 and 100, and the spring shims 102, 104 and 106 a spring clamp bar 108 which is operable in a manner yet to be described for purposes of clamping the upper ends of the aforementioned spring members 98 and 100, and the spring shims 102, 104 and 106 to the top angle plate 76. More specifically, a pair of threaded fasteners 110, which are depicted in FIG. 2 of the drawings, are utilized for purposes of fastening the spring clamp bar 108, the upper ends of the spring members 98 and 100, and the three spring shims 102, 104 and 106 to the top angle plate 76. To this end, the spring clamp bar 108, the upper ends of the spring members 98 and 100, and the three spring shims 102, 104 and 106 are each provided with a pair of openings 112, 114 anad 116, respectively, through which the threaded fasteners 110 pass. The latter fasteners 110 are then threadedly engaged in the threaded openings 118 with which the top angle plate 76 is provided at each end thereof.

A construction similar to that described in the preceding paragraph is employed for purposes of clamping the lower ends of the spring members 98 and 100 to the side plates 84 and 86 and therethrough to the bottom angle 26. More specifically, as depicted in FIG. 8 of the drawings a multiplicity of shims 120, 122 and 124 are also cooperatively associated with the lower end of the spring members 98 and 100, with the spring shim 120 being positioned on the outside of the spring member 98, the spring shim 122 between the spring members 98 and 100, and the spring shim 124 on the outside of the spring member 100. The spring shims 120, 122 and 124 like the previously described spring shims 102, 104 and 106 are each preferably formed of relatively thin nylon. In addition, a spring clamp bar 126 similar to the aforedescribed spring clamp bar 108 is also cooperatively associated with the lower ends of the spring members 98 and 100, and the three spring shims 120, 122 and 124. However, unlike the construction which is utilized in connection with the clamping of the upper ends of the spring members 98 and 100 and the three spring shims 102, 104 and 106 to the top angle plate 76, another spring clamp bar, i.e., bar 128 is interposed between the spring shim 120 and the outer surface of the side plate 86. As in the case of the clamping together of the spring clamp bar 108, the spring shims 102, 104 and 106, and the upper ends of the spring members 98 and 100, a pair of threaded fasteners 130, seen in FIG. 2 of the drawings, are employed for a like purpose in connection with the clamping of the two spring clamp bars 126 and 128, the three spring shims 120, 122 and 124, and the lower ends of the spring members 98 and 100 to the side plate 86 and therethrough to the bottom angle 26. More specifically, the pair of spring clamp bars 126 and 128, the lower ends of the spring members 98 and 100, and the three spring shims 120, 122 and 124 are each provided with a pair of openings 132, 134 and 136, respectively, through which the threaded fasteners 130 are passed. In addition, the latter fasteners 130 are passed through the pair of inner openings 92 with which the side plate 86 is provided, as previously described hereinabove, before being threadedly engaged in the threaded openings (not shown) with which each end of the bottom angle 26 is provided.

Figure 5:
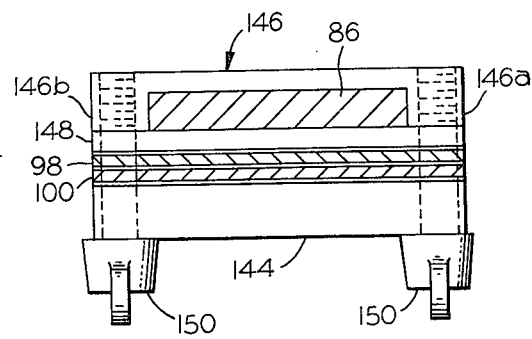
FIG. 5 is a cross sectional view of a vibratory feeder device constructed in accordance with the present invention taken substantially along the line 5—5 in FIG. 2.

As was noted previously hereinabove, one significant characteristic which distinguishes the vibratory feeder device 10 of the present invention from prior art forms of vibratory devices resides in the fact that the former device embodies adjustment means operable while the vibratory feeder device 10 is in operation for effecting an adjustment in the frequency of vibration thereof. The means whereby the aforedescribed adjustment is capable of being made will now be described. In this connection, as best understood with reference to FIG. 8 of the drawings, a third group of spring shims, namely the shims 138, 140 and 142 are cooperatively associated with the spring members 98 and 100. The spring shims 138, 140 and 142 are suitably positioned relative to the spring members 98 and 100 so as to be located intermediate the ends thereof, and with the spring shim 138 being located outside of the spring member 98, the spring shim 140 between the spring members 98 and 100, and the spring shim 142 outside of the spring member 100. It will be noted with reference to FIG. 8 of the drawings that the length of each of the spring shims 138, 140 and 142 exceeds that of the width of the spring members 98 and 100 whereby the opposite ends of the spring shims 138, 140 and 142 project outwardly of the spring members 98 and 100. Moreover, it will be noted that the length of the spring shims 138, 140 and 142 is greater than the length of the other spring shims 102, 104, 106, 120, 122 and 124 which have been described previously hereinabove. Otherwise, the spring shims 138, 140 and 142 are similar in nature to the other shims 102, 104, 106, 120, 122 and 124 in that they are all formed of relatively thin nylon and are each substantially rectangular in configuration. A pair of adjustable spring clamp bars 144 and 146, and an adjustable spacer bar 148 are also cooperatively associated with the spring members 98 and 100, and the spring shims 138, 140 and 142. More specifically, the adjustable spring clamp bar 144 which comprises an elongated rectangular member that has a length substantially equal to that of the shims 138, 140 and 142 is positioned in juxtaposed relation to the spring shim 142. The other adjustable spring clamp bar, i.e., the bar 146 on the other hand is substantially equal in length to the adjustable spring clamp bar 144 but differs from the latter in that whereas the adjustable spring clamp 144 embodies a rectangular configuration the adjustable spring clamp bar 146 embodies a substantially U-shaped configuration. By vitue of the latter configuration, the adjustable spring clamp bar 146 in a manner yet to be described and which is best seen in FIG. 5 of the drawings is suitably dimensioned so as to be capable of receiving between the two leg portions 146a and 146b thereof the side plate 86. Moreover, in this regard it will be noted with reference to FIG. 8 of the drawings that the intermediate portion of the side plate 86 for the aforedescribed purpose is of lesser width than are the ends thereof. Insofar as concerns the adjustable spacer bar 148, the latter is similar in construction to the previously described bar 128 but differs therefrom in that the bar 148 which is substantially equal in length to the adjustable spring clamp bars 144 and 146 is greater in length than the bar 128. The adjustable spacer bar 148 as depicted in FIG. 8 of the drawings is positioned relative to the spring members 98 and 100 and the three spring shims 138, 140 and 142 so as to be interposed between the spring shim 138 and the surface of the side plate 86. The pair of spring members 98 and 100, the three spring shims 138, 140 and 142 and the adjustable spacer bar 148 are held in clamped relation with each other and with the side plate 86 between the adjustable spring clamp bars 144 and 146 by means of a pair of threaded wing screws 150, only one of which is shown in FIG. 8. To this end, the adjustable spring clamp bar 144, the three spring shims 138, 140 and 142, and the adjustable spacer bar 148 are each provided with a pair of openings 152, 154 and 156, respectively. More specifically, the pair of wing screws 150 are passed through the openings 152 in the adjustable spring clamp bar 144, the openings 154 in the spring shims 138, 140 and 142, the openings 156 in the adjustable spacer bar 148, and are threadedly engaged in the pair of threaded openings 158 with which the adjustable spring clamp bar 146 is provided. It will be understood with reference to FIG. 8 of the drawings that the wing screws 150 do not pass through the spring members 98 and 100 but rather pass externally thereof on either side of the spring members 98 and 100 intermediate the ends thereof. Moreover, it can be readily seen that by virtue of the aforedescribed construction, it is possible to adjust the distance which exists between the adjustable spring clamp bar 144 on the one hand and the adjustable spring clamp bar 146 on the other hand by varying the extent to which the wing screws 150 are screwed into the threaded openings 158 which are provided therefor in the adjustable spring clamp bar 146.

For purposes of completing the description of the structure which is embodied in the vibratory feeder device 10, attention will be directed to FIGS. 1 and 8 of the drawings. As shown in FIG. 1, the vibratory feeder device 10 is preferably provided with a pair of side covers 160, only one of which is visible in FIG. 1. The side cover 160 as shown in FIG. 1 preferably includes on its surface along the edges thereof indicia, generally designated by reference numeral 162. The latter indicia 162, as will be made more readily apparent from the description to follow hereinafter of the manner in which the vibratory feeder device 10 operates, functions as an adjustable tuning bar scale. In accord with the illustrated embodiment of the invention, the side covers 160 are mounted on the vibratory feeder device 10 by means of a plurality of threaded fasteners 164. The latter fasteners 164 pass through suitable openings (not shown) provided therefor in the four corners of each of the side covers 160, and with one vertically aligned pair of the threaded fasteners 164 being received in threaded engagement in threaded openings (not shown) provided therefor in the side plate 84 and the other pair of vertically aligned threaded fasteners 164 being threadedly engaged in threaded openings (not shown) provided therefor in the side plate 86.

To provide for the mounting of suitable tooling 12 on the vibratory feeder device 10, the latter is provided with a plurality of threaded openings, namely the opening 166 and the openings 168, each of which is capable of receiving therein a threaded fastener (not shown) operable for fastening the tooling 12 to the vibratory feeder device 10. More specifically, an opening 166 is formed substantially at the center of the vertically extending leg 82 of the top angle plate 76 whereby to enable through the use thereof tooling to be mounted on the side of the vibratory feeder device 10. In addition, at least a pair of openings 168 are provided as shown in FIG. 8 of the drawings in the top surface of the horizontally extending leg 80 of the top angle plate 76 whereby to enable tooling, as for instance the tooling 12 schematically depicted in FIG. 1 of the drawings, to be mounted on the top of the vibratory feeder device 10. It can therefore be seen that the vibratory feeder device 10 embodies the capability of permitting tooling to be mounted on either the side or the top thereof.

In order to supply electrical power to the vibratory feeder device 10 for purposes of causing the energization of the coil assembly 44, there is provided in the vibratory feeder device 10 suitable wiring generally designated by reference numeral 170 in FIG. 1 of the drawings. One end of the wiring 170 is connected in electrical circuit relation with the coil assembly 44 while the other end thereof is connectable to a suitable electrical power supply. Inasmuch as the manner in which the wiring 170 is connected to the coil assembly 44 is only indirectly related to the invention being described herein and inasmuch as the manner in which such electrical connections are accomplished are well-known to those skilled in the art, it has not been deemed necessary to describe herein more fully or to illustrate in the drawings the aforereferenced electrical connection in order for one to obtain an understanding of the present invention. Suffice it to say that in accord with the preferred embodiment of the invention, the wiring 170 takes the form of a conventional power cord and the interconnection of one end thereof with the coil assembly 44 is accomplished by plugging the aforesaid one end of the power cord into suitable means such as for instance the device which is commonly referred to by those skilled in the art as a "banana jack."

There will now be set forth a description of the manner in which the vibratory feeder device 10 constructed in accord with the present invention operates. Assuming for purposes of this description that the power cord 170 has been connected in electrical circuit relation with a suitable source of electrical power which in accord with the preferred embodiment of the invention takes the form of a direct current (D.C.) half wave power supply, the electrical current flowing through the power cord 170 to the coil assembly 44 operates to cause the latter to become energized. By virtue of this energization, the coil assembly 44 functions to apply a magnetic pull on the armature assembly 56 causing the latter to move towards the coil assembly 44. As best understood with reference to FIG. 6 of the drawings, as the armature assembly 56 is pulled towards the coil assembly 44 the armature arm 64 which is operatively connected to the armature assembly 56 and more particularly the armature bar 62 thereof is also caused to move. Movement of the armature arm 64 in turn is transmitted to the top angle plate 76 to which one end of the former is securely fastened. Consequently, the top angle plate 76 is made to move substantially in a horizontal plane as viewed for example with reference to FIG. 6 of the drawings. More specifically, the top angle plate 76 is caused to reciprocate longitudinally which fact has been schematically depicted through the use of a double-headed arrow with which the top angle plate 76 has been provided in FIG. 6. This reciprocating action results from the fact that the electrical power being supplied to the coil assembly 44, as noted above, is in the form of a D.C. half wave. Accordingly, an intermittent magnetic pull is provided by the coil assembly 44 and applied to the armature assembly 56. Thus, in the absence of a magnetic pull being applied thereto the armature assembly 56 will return to its normal, i.e., unactuated position wherein as shown in FIG. 6 of the drawings, the armature assembly 56 is spaced from the coil assembly 44. In this regard, the return movement of the armature assembly 56 occurs under the influence of the springs 68 as well as the normal tendency of the spring members 98 and 100 and the top angle plate 76 to move to their normal, i.e., unbiased position, the latter being illustrated in FIG. 1 of the drawings. It of course will be readily understood that the aforedescribed longitudinal movement of the top angle plate 76 is made possible by virtue of the fact that the interconnection of the top angle plate 76 and the bottom angle 26 is accomplished through the pair of spring members 98 and 100. Namely, the spring members 98 and 100 are sufficiently resilient so that they will flex about a vertical axis as viewed with reference to FIG. 6 of the drawings.

The vibratory feeder device 10 constructed in accord with the present invention embodies means operable for purposes of enabling three different adjustments to be made thereto. The first of these three adjustments which will be described herein is that of the vibrating firing angle. The latter angle consists of the angle at which the bottom angle 26 is pivoted relative to the base mounting angle 16, and is denoted by means of the coaction between the center line 32 which is provided for this purpose on the vertically extending leg 30 of the bottom angle 26 and the indicia 24, the latter consisting of a multiplicity of suitably arranged angular markings, which appear on the vertically extending leg 20 of the base mounting angle 16. With the bottom angle 26 positioned relative to the base mounting angle 16 so that the center line 32 is suitably aligned with the midpoint of the surface 20a of the leg 20, a vibrating firing angle of zero is established for the vibratory feeder device 10. However, by loosening the bolt 34 and causing the bottom angle 26 and thereby the remaining portion of the vibratory feeder device 10 to pivot about the bolt 34 relative to the base mounting angle 16 either to the right as depicted in solid lines in FIG. 4 of the drawings or to the left as shown in broken lines in the same figure, the vibrating firing angle of the vibratory feeder device 10 may be adjusted. With the bolt 34 so loosened, once the desired vibratory firing angle has been established, i.e., is indicated through the alignment of the center line 32 with the desired angular marking of the indicia 24, the bolt 34 is retightened to securely maintain the bottom angle 26 so positioned relative to the base mounting angle 16. In accord with the preferred embodiment of the invention, the vibrating firing angle for the vibratory feeder device 10 is adjustable in a range of between 0° and 40°. Moreover, the vibratory feeder device 10 may be made to vibrate either to the left or to the right depending on the direction to which the bottom angle 26 is tipped relative to the base mounting angle 16 about the bolt 34.

The next two adjustments which can be made to the vibratory feeder device 10 serve, as has been mentioned previously hereinabove, to distinguish the vibratory feeder device 10 from prior art forms of vibratory devices in that unlike in the latter devices these adjustments to the vibratory feeder device 10 can be effected while the vibratory feeder device 10 is operating. The adjustments to which reference is had here are the adjustment of the armature gap setting between the coil assembly 44 and the armature assembly 56, and the adjustment of the spring tension bars, i.e., the spring members 98 and 100 to provide for easy on-the-job tuning of the vibratory feeder device 10. As best understood with reference to FIGS. 6 and 7 of the drawings, the adjustment of the armature gap setting, the latter being denoted by the arrows identified by the numerals 70 in FIG. 7, is effected by varying the degree to which the threaded fasteners 66 are threaded into the threaded openings provided therefor in the armature bar 62. Namely, the more the threaded fasteners 66 are threaded into the openings provided therefor in the armature bar 62 the closer the latter will be positioned to the inner surface of the armature arm 64 and thereby the greater will be the armature gap setting, i.e., the spacing between the magnetic laminations 58 of the armature assembly 56 and the coil assembly 44. Conversely, the less the threaded fasteners 66 are threaded into the openings provided therefor in the armature bar 62 the further the latter will be spaced from the inner surface of the armature arm 64 and thereby the less will be the armature gap setting.

Insofar as concerns the adjustment of the spring members 98 and 100, this is accomplished by varying the spacing which exists between the adjustable spring clamp bar 144 and the adjustable spring clamp bar 146. The extent to which the aforesaid adjustable spring clamp bar 144 and 146 are spaced apart is in turn determined by the extent to which the wing screws 150 are threaded into the threaded openings 158 which are provided therefor in the adjustable spring clamp bar 146. Namely, the more the wing screws 150 are threaded into the openings 158 provided in the adjustable spring clamp bar 146 the tighter will the spring members 98 and 100 be clamped. Conversely, the less the wing screws 150 are threaded into the openings 158 of the adjustable spring clamp bar 146 the less clamping there will be of the spring members 98 and 100. In this connection, for purposes of providing some readily obtainable indication of the degree to which the spring members 98 and 100 are held clamped between the adjustable spring clamp bars 144 and 146, the side covers 160 are preferably provided with the indicia 162 which appears thereon. In addition, the side covers 160 preferably each embody a crisscross bend which has the effect, as best understood with reference to FIG. 2 of the drawings, of causing the side covers 160 to bulge slightly outwardly away from the sides of the vibratory feeder device 10. More specifically, the indicia 162 which each consists of a multiplicity of suitably spaced numerical markings is operable in this connection as a visual indicator. The manner in which the indicia 162 is intended to be employed is as follows. First, by noting which of the numerical markings of the indicia 162 is aligned with a particular reference point such as for instance the upper surface of the wing screws 150 a reference is established which corresponds to the extent to which the spring members 98 and 100 are presently being held clamped between the adjustable spring clamp bars 144 and 146, i.e., the latter being a function of the frequency of vibration of the vibratory feeder device 10. Thereafter, assuming it is desired to adjust the tuning, i.e., the frequency of vibration of the vibratory feeder device 10, the wing screws 150 are either loosened or tightened depending on the nature of the change which must be effected in the tuning of the vibratory feeder device 10. The aforesaid adjustment of the wing screws 150 is continued until the desired tuning of the vibratory feeder device 10 is obtained. Obviously, it is to be understood that the aforedescribed tuning of the vibratory feeder device 10 is accomplished by adjusting each of the four wing screws 150 to effect the desired tuning. In addition, it should be stressed that the aforedescribed adjustment of the tuning of the vibratory feeder device 10 is accomplished while the latter is operating. The importance of this latter characteristic of the vibratory feeder device 10 is that it completely obviates the necessity of employing the trial and error procedure which is commonly found to be required for purposes of adjusting prior art forms of vibratory devices. More specifically, it is desirable that vibratory feeder devices of the type to which the present invention pertains be capable of being adjusted on the job so as to render these devices compatible with different forms of loads with which it is desired to utilize the vibrating feeder devices, i.e., that the vibratory feeder device be capable of being tuned to the appropriate frequency of vibration for the particular load with which it is being employed. Obviously, it would not be desirable either from an economic standpoint or from the standpoint of ease of employment to be required to provide a different vibratory feeder device for each different load. Although there have been provided in accord with the teachings of the prior art vibratory devices which embody the capability of being tuned, the disadvantage therewith has been that in order to effect an adjustment of the tuning thereof such prior art forms of vibratory devices must be in an inactive condition. Namely, the operation of the vibratory feeder device must be stopped in order to effect the adjustment. This requirement however renders the task of effecting the adjustment difficult in that it is necessary to employ a trial and error procedure to properly tune the subject vibratory device. More specifically, it has been necessary to follow the procedure set forth hereinafter in order to effect a tuning of such a vibratory feeder device. First, recognizing that the vibratory feeder device is not correctly tuned for the particular load with which it is desired to be employed, the feeder device must be shut off. With the feeder device in an inoperative state, the frequency of vibration of the feeder device is adjusted by means of the adjustment means with which the latter is provided. Then, the vibratory feeder device is once again placed in an operative state in order to determine whether the adjustment which has been made is sufficient to cause the vibratory feeder device to be properly tuned for the particular load with which it is to be employed. If it is found that the vibratory feeder device is still not properly tuned, then the feeder device must once again be shut off and a further adjustment made thereto. The aforedescribed trial and error, i.e., cut and try procedure is continuously repeated until the vibratory feeder device is found to be correctly tuned. With the vibratory feeder device 10 constructed in accord with the present invention, the aforedescribed undesirable adjustment procedure is completely obviated.

To better exemplify the above, there will now be described with specificity the manner in which one particular tuning adjustment of the vibratory feeder device 10 is effected. Thus, when it is desired to tune the device 10, or a pair of such devices wherein the latter are being utilized for purposes of supporting a so-called untooled track, the following procedure is followed. The untooled track (not shown) is bolted between the pair of devices 10 using the mounting holes 166, and the devices 10 are spaced relative to each other so that they are 18 inches apart. It will be assumed for purposes of this description that the untooled track is 32 inches long and weighs 12 pounds. The first step is to connect the devices 10 to a suitable D. C. power supply, and then the power supply is turned ON at about one-half of its maximum amperage. This will have the effect of causing the devices 10 to begin vibrating. The tuning is accomplished by first noting the position that the tuning bars occupy relative to the index 162 which is provided for this purpose on at least one of the side covers 160. Assume for purposes of this description that the tuning bars are positioned relative to the lowest end of the index 162. In order to effect the necessary tuning adjustment, the wing screws 150 are loosened and the tuning assembly is manually moved in a vertical direction as viewed with reference to FIG. 1 of the drawings so that the former are now positioned adjacent another setting or number on the scale, i.e., index 162. Thereafter the wing screws 150 are once again retightened. It is important to note here that the aforedescribed manipulation of the wing screws 150 and the tuning assembly is capable of being performed while the devices 10 are in an operating state, i.e., vibrating. Preferably, the index 162 is suitably calibrated so that each higher setting, i.e., number thereof is equivalent to an additional 1 pound of weight that can be carried on the untooled track. Returning now to the description of the manner in which the tuning adjustment is accomplished, as set forth above an adjustment has been made up to a higher setting. At this time an object such as a penny or some similar article of equivalent size is placed on the untooled track. It will be assumed that the movement of the object is found to be very slow in the direction of the exit from the track. This evidences a need for further adjustment. Consequently, the wing screws 150 are again loosened and the tuning bars are adjusted so that, for example, they are now located adjacent to the numeral 3 on the index 162, i.e., as depicted in FIG. 1 of the drawings. The same adjustment is made on the other side of the device 10, and the wing screws 150 are retightened. When the object is again placed on the track, the movement thereof thereon should now be observed to be at a higher rate of speed. The other one of the pair of devices 10 would then be tuned in a similar manner. Assuming that the aforedescribed adjustments are effective to place both devices 10 in tune, if the object, i.e., penny is placed on the track it should vibrate across the untooled track of 32 inches in about 4 seconds. If the track is found to be moving faster than needed, it can be slowed down by adjusting the power supply. Conversely, if the track is moving too slow, it can be speeded up. From the above, it should be readily apparent that the vibratory feeder device 10 of the present invention enjoys a significant advantage over prior art forms of vibratory devices in the fact that the former embodies the capability of being adjustably tuned while the device 10 is in operation. In contrast thereto, prior art forms of vibratory devices have to be stopped, disassembled and adjustments made by adding to or taking off springs or weights. Then the device has to be reassembled and restarted to determine if the proper adjustment has been made. The latter procedure is unnecessarily time-consuming. With the vibratory feeder device 10 of the present invention, there is need only to attach the tooled or untooled track to the devices, start the devices, and then effect the necessary tuning while the devices are vibrating.

Although only one embodiment of a vibratory feeder device constructed in accordance with the present invention, which is particularly suited to be employed in association with automatic machinery for purposes of moving disoriented parts into orientation, for inspecting and/or counting and/or applying parts, etc. and which is characterized by the fact that means are embodied therein which permit both the frequency of vibration to be tuned and the armature gap setting to be adjusted while the device is operating, has been shown in the drawings and described hereinabove, it is nevertheless to be understood that modifications in the construction thereof may be made thereto by those skilled in the art without departing from the essence of the invention. In this connection, some of the modifications which can be made in the vibratory feeder device of the present invention have been alluded to hereinabove while others will become readily apparent to those skilled in the art when exposed to the present description and illustration of the construction of the vibratory feeder device 10. For instance, although it is preferable to power the vibratory feeder device 10 by means of a D.C. half wave power supply so that the vibratory feeder device 10 operates at 60 HZ., which is 3,600 motions per minute, other suitable means may also be utilized in this connection without departing from the essence of the invention. Also, some means other than the center line 32 and the indicia 24 could be employed, if so desired, for providing a visual indication of the vibrating firing angle without departing from the essence of the present invention. In addition, the vibratory feeder device 10 could obviously also be mounted to a suitable mounting surface 14 other than through the use of fasteners which are received in the openings 22 formed in the horizontal leg 18 of the base mounting angle 16. It should also be noted that by employing three vibratory feeder devices 10 suitably arranged in a circle and with a circular track mounted thereon a circular vibratory feeder is capable of being provided. If so desired, some means other than the index 162 appearing on the side covers 160 could be utilized for purposes of providing a visual indication of the extent to which the spring members 98 and 100 are being clamped. Moreover, the tooling 12 could be mounted on the top angle plate 76 in some manner other than that described hereinabove if so desired, without departing from the essence of the present invention.

Thus, it can be seen that the present invention provides a novel and improved feeder device of the type which is particularly suited to be employed in association with automatic machinery for purposes of conveying objects thereto. Moreover, in accord with the present invention a feeder device has been provided which is of the vibratory type. The feeder device of the present invention in addition to the conveying function is also capable of being employed to effect orientation of disoriented objects, to enable the conveyed objects to be counted, to enable the conveyed objects to be inspected, etc. Furthermore, in accord with the present invention there has been provided a feeder device which is characterized in the fact that it possesses the capability of enabling the frequency of vibration thereof to be tuned while the device is operating. Also, a feeder device has been provided in accord with the present invention which is characterized in the fact that it possesses the capability of enabling the armature gap setting to be adjusted while the device is operating. Finally, in accord with the present invention there has been provided a feeder device which is characterized by its flexibility in that it permits tooling to be bolted thereto either on the left side thereof, the right side thereof or the top thereof, also by the fact that it embodies a durable construction, and finally by the fact that it is capable of high speed operation.

Having thus described the invention, I claim:

1. A vibratory feeder device particularly suited for employment in association with automatic machinery for purposes of causing objects to be conveyed thereto comprising:
   a. a base means operable as a support for mounting the vibratory feeder device on a mounting surface;
   b. a bottom member cooperable with said base means for establishing the vibrating firing angle of the vibratory feeder device;
   c. means pivotably mounting said bottom member on said base means for pivotal movement relative thereto to enable said bottom member to be selectively positioned in any one of a multiplicity of angular positions relative to said base means, at least one of said base means and bottom member carrying calibration indicia to identify the angular orientation of said bottom member relative to said base means, each of said multiplicity of positions corresponding to a different calibrated firing angle for the vibratory feeder device;
   d. a coil assembly supported on said bottom member;
   e. electrical wiring means operatively connected at one end to said coil assembly and connectable at the other end to an electrical power supply for completing an electrical circuit between said coil assembly and the electrical power supply in order to provide electrical power to said coil assembly to cause said coil assembly to be intermittently energized for purposes of providing a magnetic pull from said coil assembly;
   f. an armature assembly supported in spaced relation to said coil assembly so as to establish a predetermined armature gap setting between said armature assembly and said coil assembly, said armature assembly being further positioned relative to said coil assembly so as to lie within the magnetic field produced by said coil assembly so as to be drawn towards said coil assembly by the magnetic pull generated by said coil assembly when said coil assembly is in an energized state;
g. a top member operable as a support for mounting tooling thereto;
h. means operatively connected at one end to said armature assembly and at the other end to said top member for supporting said armature assembly on said top member and transmitting the motion of said armature assembly to said top member to produce a corresponding movement of said top member;
i. spring means operatively connected at one end to said top member and at the other end to said bottom member and supporting said top member on said bottom member, said spring means comprising a set of spring plates extending between said top and bottom members adjacent each end thereof;
j. first adjustment means cooperatively associated with said spring means and operable for effecting an adjustment of the frequency of vibration of said spring means in order to achieve proper tuning of the vibratory feeder device while the vibratory feeder device is operating, said first adjustment means including an adjustable clamping means extending about each set of spring plates to apply adjustable clamping force thereto and thereby affect the frequency of vibration; and
k. second adjustment means cooperatively associated with said armature assembly operable for effecting an adjustment in the armature gap setting of the vibratory feeder device while the vibratory feeder device is operating.

2. The vibratory feeder device as set forth in claim 1 wherein said top member comprises an L-shaped member having a horizontally extending leg and a vertically extending leg to define substantially a right angle therebetween, said horizontally extending leg and said vertically extending leg each including means operable to mount tooling on one leg of the vibratory feeder device.

3. The vibratory feeder device as set forth in claim 1 wherein said armature assembly comprises a multiplicity of magnetic laminations and an armature bar operatively connected together to form a unitary assembly.

4. The vibratory feeder device as set forth in claim 3 wherein said means operatively interconnecting said armature assembly with said top member comprises an armature arm having one end attached to said armature bar of said armature assembly and the other end affixed to said top member.

5. The vibratory feeder device as set forth in claim 1 further comprising a top plate, a pair of side plates each having one end thereof affixed to said top plate and the other end affixed to said bottom member, and a pair of side covers each having one side thereof fastened to one of said pair of side plates and the other side thereof fastened to the other of said pair of side plates, at least one of said pair of side covers bearing indicia means on the surface thereof operable to provide a visual reference point for use in effecting an adjustment in the tuning of the vibratory feeder device.

6. The vibratory feeder device as set forth in claim 1 wherein said base means comprises an L-shaped member having a horizontally extending leg and a vertically extending leg integrally joined together to define substantially a right angle therebetween, said horizontally extending leg including mounting means operable for mounting said base means and thereby the vibratory feeder device on a mounting surface, said vertically extending leg including indicia means operable for use in defining the firing angle of the vibratory feeder device.

7. The vibratory feeder device as set forth in claim 6 wherein said bottom member comprises an L-shaped member having a horizontally extending leg and a vertically extending leg integrally joined together to define substantially a right angle therebetween, said vertically extending leg including a center line provided thereon cooperable with said indicia means provided on said vertically extending leg of said base means to visually depict the firing angle of the vibratory feeder device.

8. The vibratory feeder device as set forth in claim 7 wherein said means mounting said bottom member on said base means comprises a bolt passing through said vertically extending leg of each of said base means and said bottom member, said bolt being operable to enable said bottom member to pivot about said base means.

9. The vibratory feeder device as set forth in claim 1 wherein said spring means further includes a first set of shims interposed between the spring plates of each set of spring plates, a second set of shims interposed between each set of spring plates and each of said top and bottom members, and a multiplicity of fasteners fastening each set of spring plates to each of said top and bottom members.

10. The vibratory feeder device as set forth in claim 9 wherein said first adjustment means includes a first pair of adjustable clamp bars positioned on either side of a first set of spring plates intermediate the ends thereof, said first pair of adjustable clamp bars being operable to apply a clamping force to said first set of spring plates, a first pair of wing screws operatively interconnecting said first pair of adjustable clamp bars, said first pair of wing screws being adjustable to vary the spacing between said first pair of adjustable clamp bars and thereby the clamping force being applied thereby to said first set of spring plates to effect an adjustment in the frequency of vibration of said first pair of spring plates and thereby the tuning of the vibratory feeder device, a second pair of adjustable clamp bars positioned on either side of the second set of spring plates intermediate the ends thereof, said second pair of adjustable clamp bars being operable to apply a clamping force to said second set of spring plates, and a second pair of wing screws operatively interconnecting said second pair of adjustable clamp bars, said second pair of wing screws being adjustable to vary the spacing between said second pair of adjustable clamp bars and thereby the clamping force being applied thereby to said second set of spring plates to effect an adjustment in the frequency of vibration of said second set of spring plates and thereby the tuning of the vibratory feeder device.

11. A vibratory feeder device particularly suited for employment in association with automatic machinery for purposes of causing objects to be conveyed thereto comprising:
a. a base means operable as a support for mounting the vibratory feeder device on a mounting surface;
b. a bottom member cooperable with said base means for establishing the vibrating firing angle of the vibratory feeder device;
c. means pivotably mounting said bottom member on said base means for pivotal movement relative thereto to enable said bottom member to be selectively positioned in any one of a multiplicity of angular positions relative to said base means, each of said multiplicity of positions corresponding to a different firing angle for the vibratory feeder device;

d. a coil assembly supported on said bottom member;

e. electrical wiring means operatively connected at one end to said coil assembly and connectable at the other end to an electrical power supply for completing an electrical circuit between said coil assembly and the electrical power supply in order to provide electrical power to said coil assembly to cause said coil assembly to be intermittently energized for purposes of providing a magnetic pull from said coil assembly;

f. an armature assembly supported in spaced relation to said coil assembly so as to establish a predetermined armature gap setting between said armature assembly and said coil assembly, said armature assembly being further positioned relative to said coil assembly so as to lie within the magnetic field produced by said coil assembly so as to be drawn towards said coil assembly by the magnetic pull generated by said coil assembly when said coil assembly is in an energized state, said armature assembly comprising a multiplicity of magnetic laminations and an armature bar operatively connected together to form a unitary assembly;

g. a top member operable as a support for mounting tooling thereto;

h. means operatively connected at one end to said armature assembly and at the other end to said top member for supporting said armature assembly on said top member and transmitting the motion of said armature assembly to said top member to produce a corresponding movement of said top member, said means operatively interconnecting said armature assembly with said top member comprising an armature arm having one end attached to said armature bar of said armature assembly and the other end affixed to said top member;

i. spring means operatively connected at one end to said top member and at the other end to said bottom member and supporting said top member on said bottom member, said spring means comprising a set of spring plates extending between said top and bottom members adjacent each end thereof;

j. first adjustment means cooperatively associated with said spring means and operable for effecting an adjustment of the frequency of vibration of said spring means in order to achieve proper tuning of the vibratory feeder device while the vibratory feeder device is operating; and k. second adjustment means cooperatively associated with said armature assembly operable for effecting an adjustment in the armature gap setting of the vibratory feeder device while the vibratory feeder device is operating, said second adjustment means including a plurality of fasteners operable to adjustably attach said one end of said armature arm relative to said armature bar to provide a spacing therebetween effective to determine the armature gap setting of the vibratory feeder device, and spring means surrounding said plurality of fasteners operable to bias apart said one end of said armature arm and said armature bar, said plurality of fasteners being adjustable to vary the spacing between said one end of said armature arm and said armature bar and thereby effect an adjustment in the armature gap setting of the vibratory feeder device.

12. A vibratory feeder device particularly suited for employment in association with automatic machinery for purposes of causing objects to be conveyed thereto comprising:

a. a base means operable as a support for mounting the vibratory feeder device on a mounting surface;

b. a bottom member cooperable with said base means for establishing the vibrating firing angle of the vibratory feeder device;

c. means pivotably mounting said bottom member on said base means for pivotal movement relative thereto to enable said bottom member to be selectively positioned in any one of a multiplicity of angular positions relative to said base means, each of said multiplicity of positions corresponding to a different firing angle for the vibratory feeder device;

d. a coil assembly supported on said bottom member;

e. electrical wiring means operatively connected at one end to said coil assembly and connectable at the other end to an electrical power supply for completing an electrical circuit between said coil assembly and the electrical power supply in order to provide electrical power to said coil assembly to cause said coil assembly to be intermittently energized for purposes of providing a magnetic pull from said coil assembly;

f. an armature assembly supported in spaced relation to said coil assembly so as to establish a predetermined armature gap setting between said armature assembly and said coil assembly, said armature assembly being further positioned relative to said coil assembly so as to lie within the magnetic field produced by said coil assembly so as to be drawn towards said coil assembly by the magnetic pull generated by said coil assembly when said coil assembly is in an energized state;

g. a top member operable as a support for mounting tooling thereto;

h. means operatively connected at one end to said armature assembly and at the other end to said top member for supporting said armature assembly on said top member and transmitting the motion of said armature assembly to said top member to produce a corresponding movement of said top member;

i. spring means operatively connected at one end to said top member and at the other end to said bottom member and supporting said top member on said bottom member, said spring means comprising a set of spring plates extending between said top and bottom members adjacent each end thereof; and j. first adjustment means cooperatively associated with said spring means and operable for effecting an adjustment of the frequency of vibration of said spring means in order to achieve proper tuning of the vibratory feeder device while the vibratory feeder device is operating, said adjustment means including an adjustable clamping means extending about each set of spring plates to apply adjustable clamping force thereto and thereby affect the frequency of vibration, said spring means further including a first set of shims interposed between the spring plates of each set of spring plates and a second set of shims interposed between each set of spring plates and said top and bottom members.

13. The vibratory feeder device as set forth in claim 12 wherein said first adjustment means includes a first pair of adjustable clamp bars positioned on either side of said first set of spring plates intermediate the ends thereof, said first pair of adjustable clamp bars being operable to apply a clamping force to said first set of spring plates, a first pair of wing screws operatively interconnecting said first pair of adjustable clamp bars, said first pair of wing screws being adjustable to vary the spacing between said first pair of adjustable clamp bars and thereby the clamping force being applied thereby to said first set of spring plates to effect an adjustment in the frequency of vibration of said first pair of spring plates and thereby the tuning of the vibratory feeder device, a second pair of adjustable clamp bars positioned on either side of said second set of spring plates intermediate the ends thereof, said second pair of adjustable clamp bars being operable to apply a clamping force to said second set of spring plates, and a second pair of wing screws operatively interconnecting said second pair of adjustable clamp bars, said second pair of wing screws being adjustable to vary the spacing between said second pair of adjustable clamp bars and thereby the clamping force being applied thereby to said second set of spring plates to effect an adjustment in the frequency of vibration of said second set of spring plates and thereby the tuning of the vibratory feeder device.

* * * * *